July 20, 1937.  G. SUNDBACK  2,087,456
SEPARABLE INTERLOCKING FASTENER
Filed Sept. 1, 1933
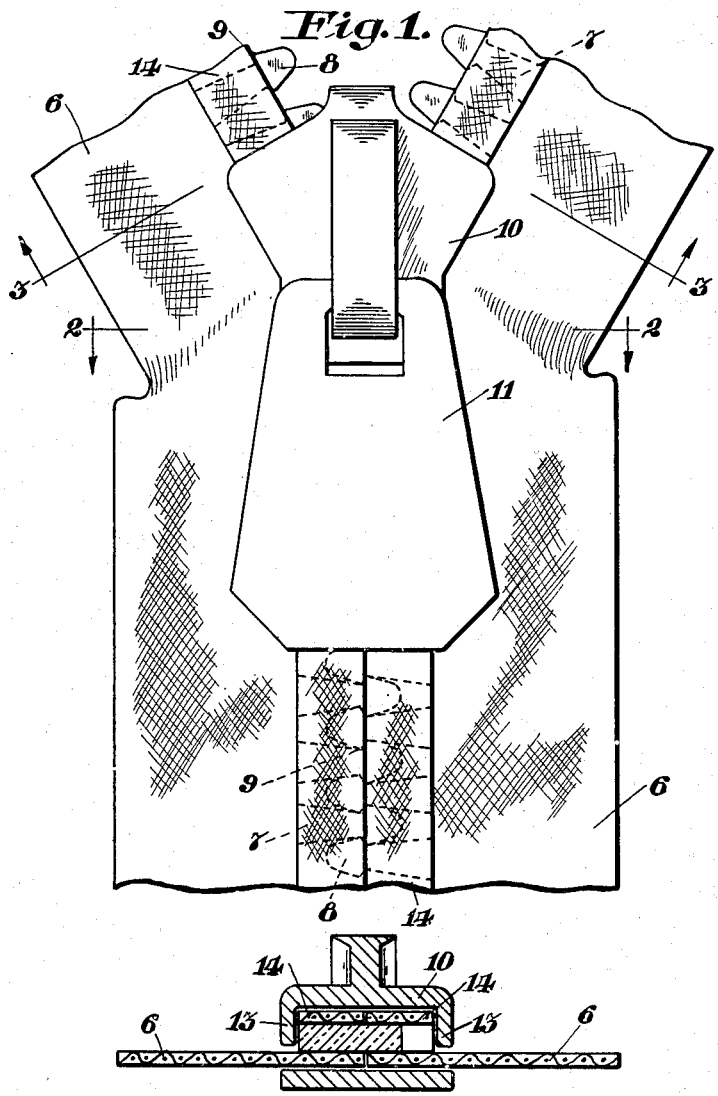
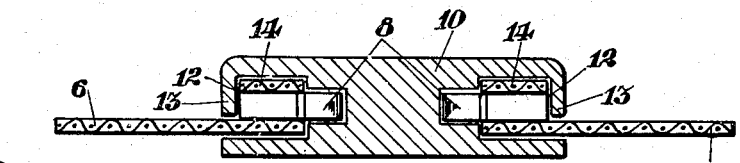
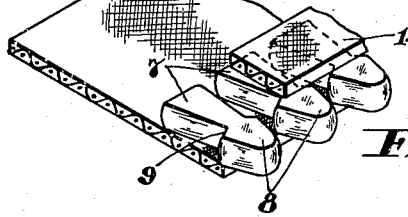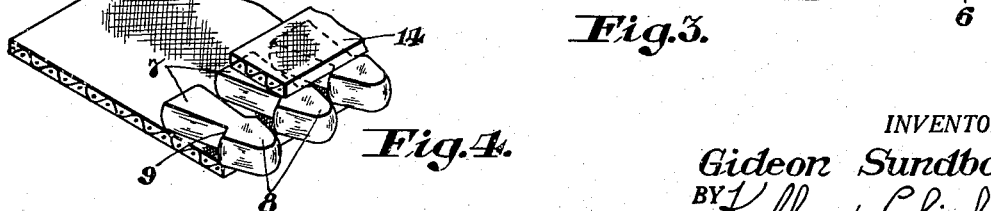
INVENTOR.
Gideon Sundback
BY Kelley + Chisholm.
ATTORNEYS.

Patented July 20, 1937

2,087,456

UNITED STATES PATENT OFFICE 2,087,456

SEPARABLE INTERLOCKING FASTENER

Gideon Sundback, Meadville, Pa., assignor to Hookless Fastener Company, Meadville, Pa., a corporation of Pennsylvania Application September 1, 1933, Serial No. 687,801

13 Claims. (Cl. 24—205)

My invention relates to separable interlocking fasteners. An object of the invention is to provide an improved form of fastener and especially one which can be readily made from non-metallic materials.

Another object of my invention is to provide a fastener which will be very neat in appearance and giving a smooth effect in any article in which it is placed.

Still another object is to provide an efficient fastener for clothing which will be cheap to manufacture.

Other objects and advantages of the invention will more fully appear during the course of the following specification. In the accompanying drawing, I have shown for purposes of illustration one embodiment which my invention may assume in practice. In this drawing:

Fig. 1 is a plan view of a fastener constructed in accordance with my invention;

Fig. 2 is a section on line 2—2 of Fig. 1;

Fig. 3 is a cross-section on line 3—3 of Fig. 1; and

Fig. 4 is a perspective view illustrating details of construction.

In the fastener illustrated there is employed a pair of mounting strips in the nature of fabric tapes 6 by which the fastener can be easily attached in a garment by sewing or any other convenient means.

The fastener members comprise small arrow-head shaped pieces arranged in uniformly spaced relation wholly on one side of the tape 6. Each of the fastener members has flat sides 7 and an arrow-head shaped projection 8, the points of which extend beyond the edge of the fabric tape. The flat surfaces 7 provide sufficient surface for sticking them to the fabric tape and the sticking may be accomplished by certain known processes such as cementing, gluing or by softening the surfaces of the members sufficiently to cause them to adhere to the fabric. Preferably the fastener members are made from non-metallic materials of the soluble type such as pyralin, and in that case, the sticking may be accomplished by the use of solvents in sufficient quantity to soften the surfaces of the material. The arrow-head projections provide shoulders 9 which engage behind one another when the fastener members are intermeshed as seen in Fig. 1. The slider 10 is mounted to slide along the rows of fastener members and is actuated by a pull tab 11. This slider has a channel 12 which fits around the fastener members and guides them into intermeshed relation in a manner similar to the operation of known types of slide fasteners. The slider can be formed in any convenient manner from metal or preferably from a suitable non-metallic material. One wing of the slider can be made flat and smooth while the other wing has flanges 13 engaging over the ends of the fastener members. When the fastener is closed the projecting portions 8 overlap the opposing mounting strip 6 and thus prevent transverse separation.

It is desirable to provide a smooth finished appearance of the fastener and for this purpose fabric strips 14 are stuck to the upper surfaces of the fastener members. The slider rides over this upper strip as well as the lower strip 6. The arrow-head projections engage between the strips 14 and 6 so that the additional strips 14 make the fastener even more secure against transverse disengagement.

As a result of my invention it will be observed that a slide fastener has been devised with solid block-like members separate from one another but connected together in series by a flexible mounting tape which is secured, preferably adhesively, to the outer surface of the block-like members, as distinguished from the common fastening device of this class in which the individual elements are clamped around the edge of the tape.

While I have shown and described in this application one embodiment which my invention may assume in practice, it will be understood that this embodiment is merely for the purposes of illustration and description and that other forms may be devised within the scope of my invention as set forth in the appended claims.

What I claim as my invention is:

1. A separable interlocking fastener of the class described, comprising a pair of mounting strips, cooperating series of separate individual non-metallic fastener members uniformly spaced along the edges of said strips each series of said members being disposed wholly on one side of a strip and adhesively secured to the contiguous side face of the strip, said members each having a portion projecting from the edge of the strip and having head portions which interlock when the fastener members are intermeshed.

2. A separable interlocking fastener of the class described, comprising a pair of fabric mounting strips, cooperating series of fastener members arranged wholly on one side of said strips and the contacting surfaces of said fastener members and strip being adhesively secured together, said fastener members having head portions adapted to interlock when the fastener members are interengaged and having projecting portions engaged behind the opposing mounting strip to prevent transverse disengagement.

3. A separable interlocking fastener comprising cooperating rows of separate individual fastener members arranged in uniformly spaced relation, said fastener members having flat parallel side faces, continuous flexible tapes adhesively secured to said parallel faces on both sides to maintain said fastener members in position for interlocking, one of said tapes having an integral extension beyond the fastener members to provide means for attaching the fastener in an article, each of said members having an interlocking head which projects beyond the tapes for engagement with fastener members on the opposite series.

4. A separable interlocking fastener of the class described comprising cooperating series of fastener members arranged in uniformly spaced relation, each fastener member being in the form of an elongated block with parallel sides and an arrow-shaped head, flexible supporting tapes adhesively secured to said parallel sides and extending continuously for the entire length of each series of fastener members, each of the arrow-shaped heads being adapted to penetrate the space between two similar heads on the opposite series and to be engaged between the flexible tapes on the opposite series.

5. A separable interlocking fastener of the class described, comprising in combination a pair of fabric strips, a row of separate individual fastener members superposed on each strip, each member having parallel side faces, one of the side faces of each member and the opposed surface of the fabric strip being adhesively secured together throughout their area, said members also having head portions adapted to interlock to prevent separation of the rows in the plane of the strips, and other flexible strips adhesively secured to the other side faces of said fastener members, each fastener member having a portion projecting beyond the edges of the strips to which it is attached and adapted to engage between the strips of the opposing row to prevent separation of the rows in a direction transverse to the plane of the strips.

6. A separable interlocking fastener comprising two cooperating series of spaced apart separate individual fastener members, said members having interlocking means which mutually interengage when the ends of the opposing series of members are intermeshed, said members consisting of solid block-like pieces of rigid material, and means for uniting together all of the fastener members of each series so as to constitute a single flexible stringer, said means comprising flexible strips positioned against the opposing outer side faces of the series of members and anchored respectively to such outer side surfaces of all of the members of the series.

7. A slide fastener comprising a pair of separate flat flexible strips arranged parallel to each other each strip having a pair of spaced walls and a series of separate individual interlocking members between the walls, said members projecting from the edges of the walls and being uniformly spaced to provide openings into the space between the walls, the interlocking members of one strip being adapted to enter the openings of the opposite strip between the walls thereof and engage the interlocking members of said opposite strip.

8. A slide fastener of the class described comprising cooperating series of solid block-like members separate from one another, a flexible mounting tape by which the members of each series are flexibly connected together, said mounting tape being secured to one of the outer surfaces of each of the block-like members.

9. A slide fastener of the class described, comprising cooperating series of solid block-like members separate from one another, a mounting tape for flexibly connecting together and holding the members of each series, the mounting tape being disposed against an outer surface of each of the fastener members and adhesively secured thereto.

10. A slide fastener of the class described, comprising cooperating series of solid block-like members separate from one another and having a flat outer surface, and a flat flexible mounting tape for connecting together and holding the members of each series, said tape being superposed on said flat outer surface of each member and adhesively secured thereto.

11. A slide fastener of the class described comprising cooperating series of solid block-like members separate from one another, and having parallel flat outer surfaces, a flat flexible mounting tape for securing together and holding the members of each series, said tape being superposed on one of the flat surfaces of each of said members and adhesively secured thereto, and a tape superposed on the other flat outer surface of each of said members and adhesively secured thereto.

12. A slide fastener comprising in combination a pair of spaced yieldable strips, means securing the strips together at regular intervals along one edge, leaving spaced openings between the securing means, a second strip of yieldable material having a series of separate individual locking elements of rigid material projecting therefrom and spaced to correspond to the openings, the projecting portions of the elements being wider than the openings, and a slider embracing the strips to direct the locking elements into the openings and between said spaced strips.

13. A slide fastener comprising in combination a pair of strips of yieldable material each strip including two spaced layers joined along one edge at regular intervals only and being separated by spaces of uniform length between said intervals, locking elements projecting from the edge of each strip between said spaces, the projecting portions of the elements being wider than the length of said spaces, and a slider embracing the strips to direct the locking elements of each strip into the openings and between the layers of the other strip.

GIDEON SUNDBACK.